(No Model.)  2 Sheets—Sheet 1.
C. H. YATES.
ELEVATOR CONTROLLER.

No. 552,223. Patented Dec. 31, 1895.

WITNESSES:

INVENTOR
Chas. H. Yates
BY Edgar Tate & Co.
ATTORNEYS (No Model.) 2 Sheets—Sheet 2.
C. H. YATES.
ELEVATOR CONTROLLER.
No. 552,223. Patented Dec. 31, 1895.
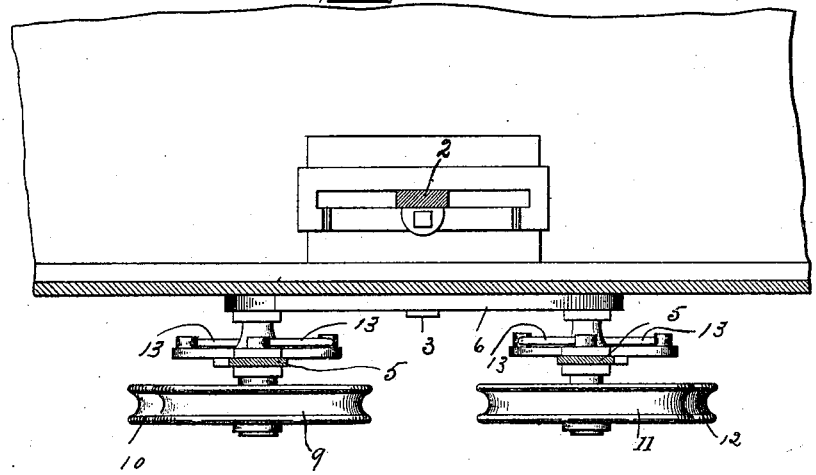
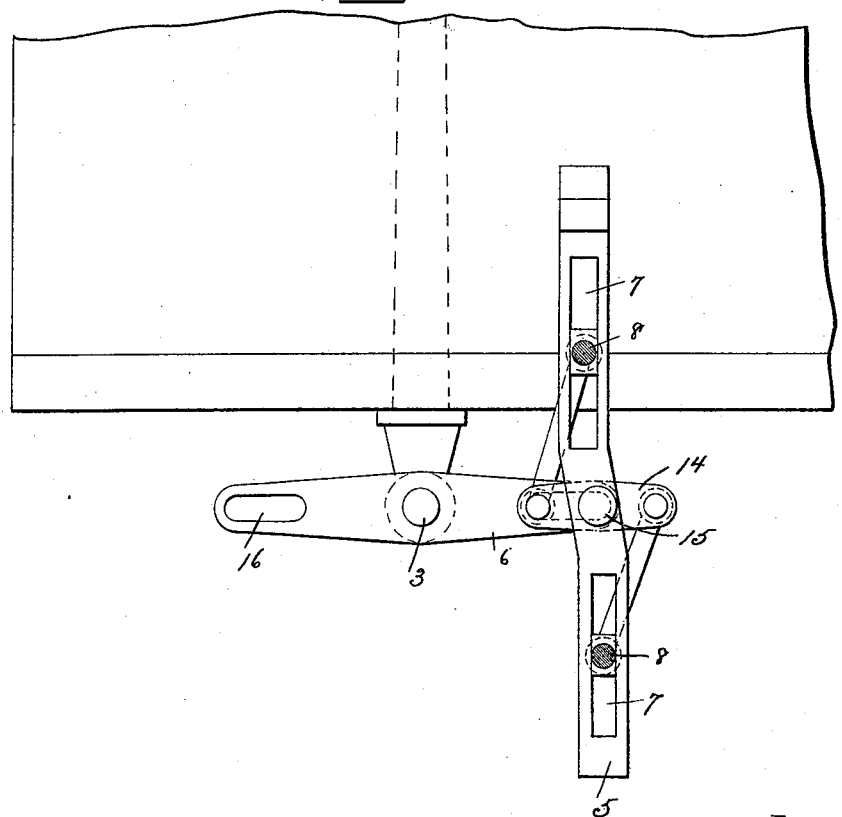

UNITED STATES PATENT OFFICE.

CHARLES H. YATES, OF BROOKLYN, NEW YORK.

ELEVATOR-CONTROLLER.

SPECIFICATION forming part of Letters Patent No. 552,223, dated December 31, 1895

Application filed February 23, 1895. Serial No. 539,351. (No model.)

*To all whom it may concern:*

Be it known that I, CHARLES H. YATES, a citizen of the United States, and a resident of Brooklyn, county of Kings, and State of New York, have invented certain new and useful Improvements in Elevator-Controllers, of which the following is a specification, reference being had to the accompanying drawings, forming a part thereof, in which similar numerals of reference indicate corresponding parts in both the figures.

My invention relates to certain improvements in the mechanism for controlling the movement of the cabs or cages of elevators, and particularly to the gearing connected with the cage and controlled by an operating-lever therein, and is fully disclosed in the following specification, of which the accompanying drawings form a part, and in which—

Figure 1:
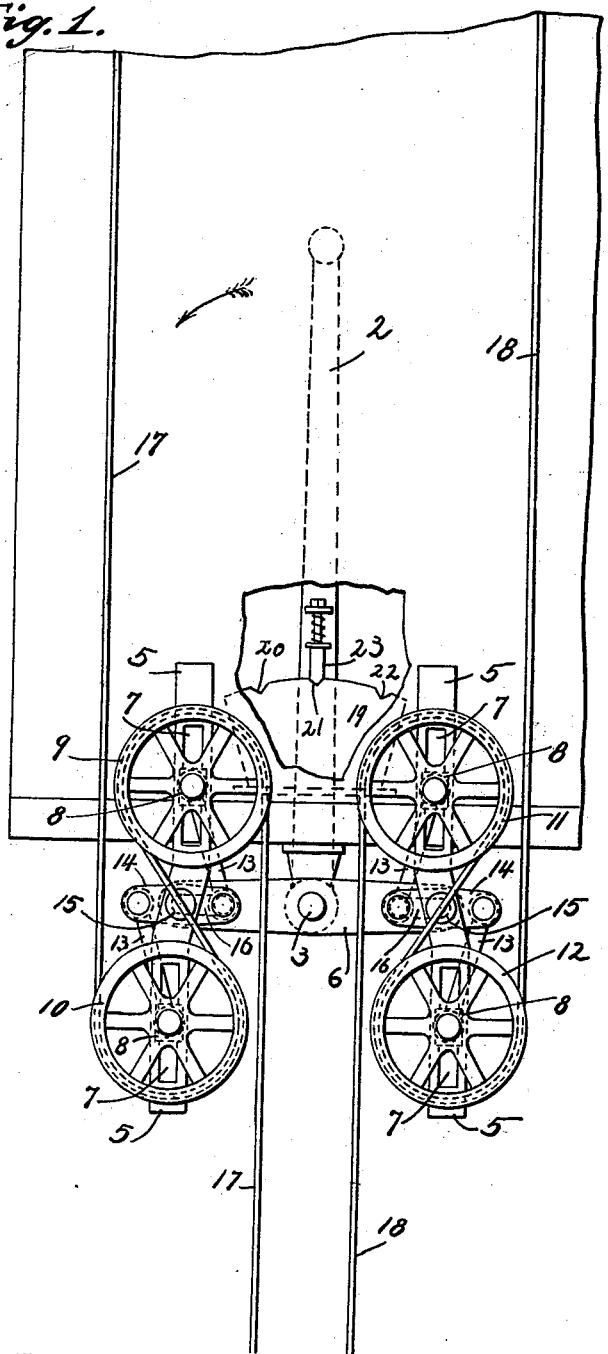
Figure 2:
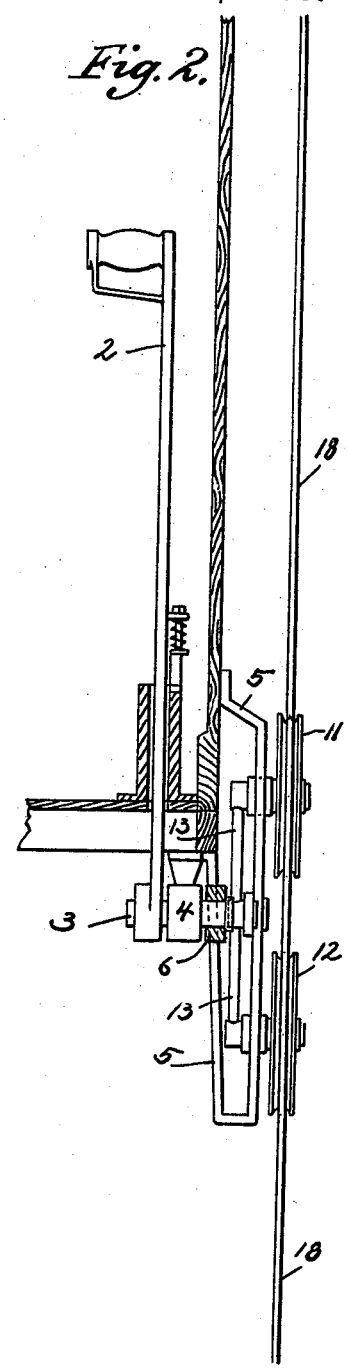

Figure 1 is a view in elevation of the improvement; and Fig. 2 is a view at a right angle to that shown in Fig. 1, parts being in section.

Referring to the drawings, the numeral 2 designates the lever within the cage by which the valve-controlling mechanism is operated. This lever passes through the bottom of the cage and is secured to a pin or shaft 3, mounted in a hanger 4, which is secured to the bottom of the cage, or which may form a part of the main frame 5, which is secured to the side and bottom of the cage, as shown in Fig. 2; and secured to said shaft on the opposite side of the hanger is an arm 6, adapted to oscillate back and forth in connection with the lever 2, with relation to which it is always at right angles.

Formed in each end of each of the side frames 5 is a vertical slot 7, in each of which is placed a sliding box 8. On the front or outer side of each of these boxes are mounted pulleys or sheaves, coupled in pairs, as 9 and 10, on one side, and 11 and 12 on the other. On the opposite or inner side of the boxes 8 are pivoted levers 13, each of which is also pivotally connected to the opposite ends of a short link 14, pivotally connected at its center 15, one to each of the frame-plates 5.

The opposite ends of the arm 6 are provided with slots 16, (shown in dotted lines, Fig. 1,) and through each of these slots extends one of the journals or pins which connect one end of the link 14, mounted on the frame 5, and one end of one of the levers 13, connected with the sliding boxes 8.

Numerals 17 and 18 represent ropes or cables usually employed. Cable 17 extends from a fixed point above (not shown) straight downward to and around pulley 10, thence diagonally upward to and around pulley 9, and thence straight downward to a pulley or sheave (not shown) for controlling the valve or belt shifter, in the usual manner. Cable 18 also extends from a fixed point above (not shown) down to and around pulley 12, thence diagonally upward and around pulley 11, and thence straight downward to the same pulley or sheave (not shown) for operating the valve or belt shifter, with which cable 17 connects, and which it is intended to operate in a direction opposite to that given it by cable 17.

The operation is as follows: In the position of the lever 2 shown in Fig. 1, the elevator will be stationary. If, now, it is desired to ascend, the lever 2 will be moved in the direction of the arrow, the end of the arm or lever 6 on that side will be depressed, and the distance between the pulleys 9 and 10 increased, by the operation of the link 14, pivoted to the frame 5, and the levers 13 connected therewith and with the boxes 7, on which the pulleys 9 and 10 are mounted. The lever 13 and pulley 10 are forced downward, and the pulley 9 and its lever 13 are forced upward, by the action of the journal or pin which connects the last-mentioned lever and one end of the link 14, in the slot 16, formed in the end of the lever or arm 6. As the distance between the pulleys 9 and 10 is increased, the cable is shortened, and this operates to open the valve (not shown) and allow the elevator to ascend. If it is desired to stop the cage, the lever 2 is moved back to the position shown, and if to descend, the said lever is moved in a direction opposite to that of the arrow, when the pulleys 11 and 12 will be separated, exactly as hereinbefore described with reference to pulleys 9 and 10, which latter will be drawn closer together, the cable will be shortened, and the valve-operating pulley (not shown) will be operated to close the valve, when the cage will descend. Within the cage is a plate 19, provided with a curved upper edge, having notches or recesses 20, 21, and 22, designed to receive a spring-operated lock or plug 23, the method of operation of which is evident, the center notch being designed to hold the lever in the position shown, when the elevator will be at rest, and the side notches designed to indicate and limit the movement of the lever in either direction.

It will be seen that I accomplish the desired result by a construction extremely simple in arrangement and operation, and by one not liable to get out of order or need repairs so frequently.

Having fully described my invention, I claim, and desire to secure by Letters Patent, the following:

1. In a valve-controlling mechanism for elevators, the combination of an arm pivoted below the cage and adapted to be operated from within the same, a frame at each side of said arm, a series of pulleys mounted in said frame, and adapted to slide vertically on their supports, the ropes, and a lever and link connection between the pulleys of each series and one end of the pivoted arm, whereby the distance between the pulleys of each series may be increased or decreased, substantially as shown and described.

2. In a valve-controlling mechanism for elevators, the combination of an arm mounted below the cage and adapted to be operated by a lever therein, side bars or frames provided with vertical slots in each end, a series of pulleys mounted on boxes adapted to slide in said slots, the ropes, a link pivoted at its center to each of said frames, and a pivoted lever extending from each end thereof to one of the sliding boxes, each of said links being in operative connection with the pivoted arm and adapted to be operated thereby, in such manner as to increase or decrease the distance between each series of pulleys, substantially as shown and described.

3. In a valve operating mechanism, the combination of an arm pivoted below the cage and adapted to be operated by a lever within the same, and provided with a longitudinal slot in each end, vertical side frames at each side of the arm, each frame being provided with vertical slots in its opposite ends, pulleys mounted on boxes in each of said slots and adapted to slide therein, a link pivoted centrally to each of said side frames and provided at each end with a pivoted arm, which also makes pivotal connection with one of the sliding boxes, one end of each link being also in pivotal connection with the slot in one end of the arm pivoted below, and adapted to be operated from within the cage, and the ropes, substantially as shown and described.

4. In a valve mechanism for operating elevator valves, the combination, with the frames, of a series of pulleys supported in vertical line on each side of a frame, each pulley of each series being adapted to slide vertically in its supports, a shaft 3, a horizontal arm connected below the cage to said shaft, a lever secured on said shaft and arranged within the cage, said arm being also provided with a horizontal slot in each end thereof, the ropes, and operative gearing connecting each end of said arm with the series of pulleys on that side in such manner that by the operating of the lever within the cage, the distance between the pulleys of each series may be increased or decreased as desired, substantially as shown and described.

In testimony that I claim the foregoing as my invention I have signed my name, in presence of two witnesses, this 20th day of February, 1895.

CHARLES H. YATES.

Witnesses:
C. GERST,
A. M. CUSACK.